Patented Oct. 23, 1923.

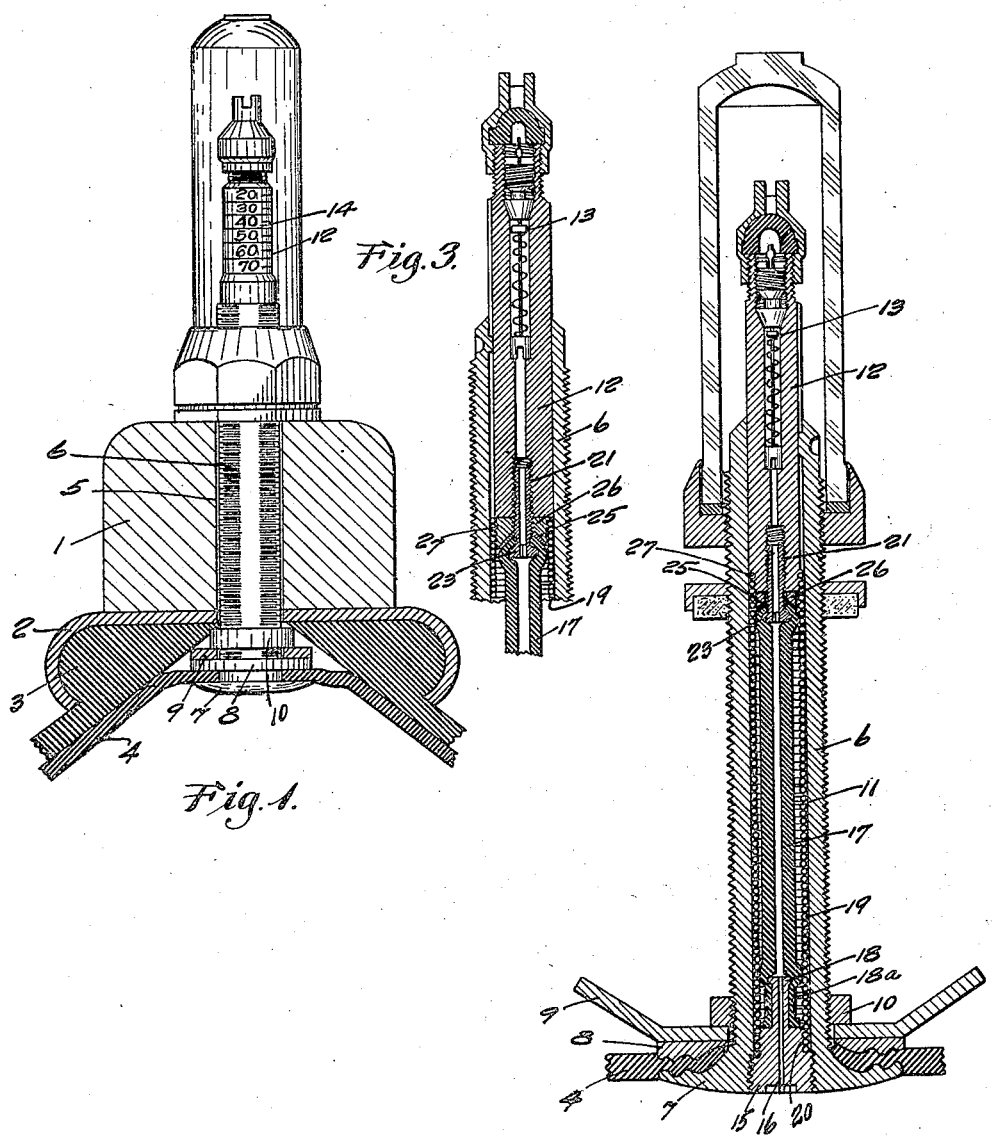

1,471,325

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TIRE-STEM PRESSURE GAUGE.

Application filed October 19, 1921. Serial No. 508,729.

*To all whom it may concern:*

Be it known that I, ALFRED BADOWSKI, a citizen of the United States, residing at Charleston, in the county of Kanawha and State of West Virginia, have invented new and useful Improvements in Tire-Stem Pressure Gauges, of which the following is a specification.

Tire stem pressure gauges have been formed with a plunger movably mounted in the stem and indicating by its movement the pressure to which the stem is subjected, the plunger being provided with an inflation passage and having communication with the inner portion of the tube maintained through a rubber or extensible tube. The movement of the plunger has been resisted by a spring. The present invention relates to means for attaching the rubber tube and also the spring to the plunger.

The invention is illustrated in the accompanying drawings as follows:—

Fig. 1 shows a central section through the felloe with a pressure gauge in place thereon.

Fig. 2 a central vertical section through the pressure gauge.

Fig. 3 a modification of the manner of securing the tube to the plunger, the modification being the preferred form.

1 marks the felloe, 2 a rim on the felloe, 3 a tire, 4 a tube, and 5 an opening through the felloe.

The stem or sleeve 6 is provided with a head 7. The tube is clamped between this head and a washer 8, the spreader 9 being provided and the nut 10 exerting the clamping pressure. The sleeve or stem has an opening 11 extending through it. The plunger 12 is slidingly mounted in the opening, the plunger having a passage extending through it provided with the usual inflation valve 13. A scale 14 is arranged on the outer surface of the plunger and indicates the inflation pressure. An anchor plug 15 is screwed into the inner end of the opening 11 and has the passage 16 through it. A rubber tube 17 extends over the nipple 18 on the upper end of the plug 15 and is secured by a wrapping 18ª. The spring 19 is also secured to the anchor plug 15, the anchor plug being screw-threaded at 20 to receive the spring. A screw 21 extends into a screw-threaded opening leading to the inflation passage of the plunger. The head 21 of the screw is arranged in the end of the tube, the screw being provided with a squared opening by means of which it may be turned by an implement extending through the tube. The end of the tube extends inwardly on the head 23 and a ferrule 25 is arranged immediately in engagement with the end of the tube and abuts a ring 26 having a tapered opening, the screw clamping the end of the tube against the ferrule and ring and forming a closure thereby and also securing the tube to the plunger. The spring 19 is secured to the plunger by being screwed on to threads 27 on the end of the plunger as shown in Fig. 2. In Fig. 3 the outer periphery of the ring 26 is screw-threaded and the spring 19 is screwed on to these screw threads. Where this structure is used the ferrule permits of the turning of the screw relatively to the ring so that the spring if secured is not disturbed.

What I claim as new is:—

1. In a tire stem pressure gauge, the combination with a sleeve; a plunger in the sleeve indicating by its movement the inflation pressure in the sleeve, said plunger being provided with an inflation passage to which leads a screw-threaded opening; a rubber tube forming an extensible means of communication from the plunger to a stationary part of the sleeve; a screw screwed into the screw-threaded opening in the plunger and having a head arranged within the end of the rubber tube; of a ring having a tapered opening into which the end of the rubber tube projects, said tube being clamped in the ring and secured to the plunger by the screw.

2. In a tire stem pressure gauge, the combination with a sleeve; a plunger in the sleeve indicating by its movement the inflation pressure in the sleeve, said plunger being provided with an inflation passage to which leads a screw-threaded opening; a rubber tube forming an extensible means of communication from the plunger to a stationary part of the sleeve; a screw screwed into the screw-threaded opening in the plunger and having a head arranged within the end of the rubber tube; of a ring into which the end of the tube projects, said tube being clamped in the ring and secured to the plunger by the screw; and a ferrule between the screw and ring.

3. In a tire stem pressure gauge, the combination with a sleeve; a plunger in the sleeve indicating by its movement the inflation pressure in the sleeve, said plunger being provided with an inflation passage to which leads a screw-threaded opening; a rubber tube forming an extensible means of communication from the plunger to a stationary part of the sleeve; a screw screwed into the screw-threaded opening in the plunger and having a head arranged within the end of the rubber tube; of a ring having a tapered opening into which the end of the rubber tube projects, said tube being clamped in the ring and secured to the plunger by the screw; and a ferrule between the screw and ring.

4. In a tire stem pressure gauge, the combination with a sleeve; a plunger in the sleeve indicating by its movement the inflation pressure in the sleeve, said plunger being provided with an inflation passage to which leads a screw-threaded opening; a rubber tube forming an extensible means of communication from the plunger to a stationary part of the sleeve; a screw screwed into the screw-threaded opening in the plunger and having a head arranged within the end of the rubber tube; of a ring into which the end of the tube projects, said tube being clamped in the ring and secured to the plunger by the screw; a ferrule between the screw and ring; and a spring secured to the ring and resisting the movement of the plunger.

In testimony whereof I have hereunto set my hand.

ALFRED BADOWSKI.